United States Patent
Amini

(10) Patent No.: US 11,853,849 B2
(45) Date of Patent: Dec. 26, 2023

(54) VIBRATIONALLY ISOLATED CRYOGENIC SHIELD FOR LOCAL HIGH-QUALITY VACUUM

(71) Applicant: IonQ, Inc., College Park, MD (US)

(72) Inventor: Jason Madjdi Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 43 days.

(21) Appl. No.: 17/449,578

(22) Filed: Sep. 30, 2021

(65) Prior Publication Data

US 2022/0051122 A1 Feb. 17, 2022

Related U.S. Application Data

(62) Division of application No. 16/242,328, filed on Jan. 8, 2019, now Pat. No. 11,205,133.

(60) Provisional application No. 62/616,859, filed on Jan. 12, 2018.

(51) Int. Cl.
| | |
|---|---|
| *F04B 37/08* | (2006.01) |
| *G06N 10/00* | (2022.01) |
| *F04B 15/08* | (2006.01) |
| *F25D 19/00* | (2006.01) |
| *B82Y 10/00* | (2011.01) |

(52) U.S. Cl.
CPC ............. *G06N 10/00* (2019.01); *F04B 15/08* (2013.01); *F04B 37/08* (2013.01); *F25D 19/006* (2013.01); *B82Y 10/00* (2013.01); *F04B 2015/081* (2013.01)

(58) Field of Classification Search
CPC .......... F04B 37/08; F04B 37/02; F04B 37/04; F25D 19/006; F25D 9/14; H01J 37/08
See application file for complete search history.

(56) References Cited

U.S. PATENT DOCUMENTS

| | | | |
|---|---|---|---|
| 4,394,819 A | * | 7/1983 | Averill ................... F17C 13/00 62/51.1 |
| 5,177,364 A | | 1/1993 | Gowlett |
| 5,451,781 A | | 9/1995 | Dietrich |
| (Continued) | | | |

FOREIGN PATENT DOCUMENTS

GB 1056186 1/1967

*Primary Examiner* — Brian M King
(74) *Attorney, Agent, or Firm* — ARENTFOX SCHIFF LLP

(57) ABSTRACT

The disclosure describes various aspects of a vibrationally isolated cryogenic shield for local high-quality vacuum. More specifically, the disclosure describes a cryogenic vacuum system replicated in a small volume in a mostly room temperature ultra-high vacuum (UHV) system by capping the volume with a suspended cryogenic cold finger coated with a high surface area sorption material to produce a localized extreme high vacuum (XHV) or near-XHV region. The system is designed to ensure that all paths from outgassing materials to the control volume, including multiple bounce paths off other warm surfaces, require at least one bounce off of the high surface area sorption material on the cold finger. The outgassing materials can therefore be pumped before reaching the control volume. To minimize vibrations, the cold finger is only loosely, mechanically connected to the rest of the chamber, and the isolated along with the cryogenic system via soft vacuum bellows.

13 Claims, 7 Drawing Sheets

(56) References Cited

U.S. PATENT DOCUMENTS

| | | | | |
|---|---|---|---|---|
| 5,552,608 A | * | 9/1996 | Gallagher | H01J 37/244 250/397 |
| 2004/0225457 A1 | * | 11/2004 | Norenberg | G01N 15/0826 702/45 |
| 2007/0044486 A1 | * | 3/2007 | Wyatt | G01J 5/061 62/51.1 |
| 2007/0102650 A1 | * | 5/2007 | Katagiri | H01J 37/18 250/492.1 |
| 2010/0050661 A1 | * | 3/2010 | Snow | F25B 9/14 62/51.1 |
| 2014/0131203 A1 | * | 5/2014 | Peng | C12Q 1/6869 204/601 |
| 2014/0332680 A1 | * | 11/2014 | Verdu Galiana | H01J 49/0031 250/282 |
| 2018/0173027 A1 | * | 6/2018 | Morse | G02F 1/113 |
| 2019/0348251 A1 | | 11/2019 | Monroe | |

* cited by examiner

VIBRATIONALLY ISOLATED CRYOGENIC SHIELD FOR LOCAL HIGH-QUALITY VACUUM

CROSS REFERENCE TO RELATED APPLICATION

The present application is a Divisional Application of U.S. patent application Ser. No. 16/242,328 filed on Jan. 8, 2019 and entitled "VIBRATIONALLY ISOLATED CRYOGENIC SHIELD FOR LOCAL HIGH-QUALITY VACUUM," which claims priority to and the benefit of U.S. Provisional Patent Application No. 62/616,859, entitled "VIBRATIONALLY ISOLATED CRYOGENIC SHIELD FOR LOCAL HIGH-QUALITY VACUUM," and filed on Jan. 12, 2018, the contents of which are incorporated herein by reference in their entirety.

BACKGROUND OF THE DISCLOSURE

Aspects of the present disclosure generally relate to different atomic systems including quantum computing or quantum information processing (QIP) systems, and more specifically, to a vibrationally isolated cold finger and/or cryogenic shield for local high-quality vacuum.

Individual optically-active quantum systems such as trapped atoms are one of the leading implementations for quantum information processing. Atom-based quantum bits (qubits) can be used as quantum memories, can host quantum gates in quantum computers and simulators, and can act as nodes for quantum communication networks. Qubits based on trapped atomic ions enjoy a rare combination of attributes. For example, qubits based on trapped atomic ions have very good coherence properties, can be prepared and measured with nearly 100% efficiency, and are readily entangled with each other by modulating their Coulomb interaction or through remote photonic interconnects. Lattices of cold (e.g., laser-cooled) trapped atoms have also proven useful for precision metrology, including sensors of small forces and atomic clocks.

Atomic ions are typically loaded into traps by creating a neutral atomic flux of the desired particle and ionizing them once in the trapping volume. Ions can remain confined for months, with lifetimes often limited by the level of vacuum. Reloading of the ions into the trap after loss of one or more ions may reduce the fraction of the time that the ions are used for applications such as QIP. Thus it is desirable to increase the ion lifetimes by providing the highest quality vacuum compatible with the application.

For QIP systems that rely on trapped ion technology, generating regions of extreme high vacuum (XHV) or even vacuum approaching XHV (i.e., near-XHV) may be a challenge because of the outgassing of chamber materials. Even stainless steel, one of the most widely used materials in ultra-high vacuum (UHV) applications, introduces large quantities of hydrogen gas into the vacuum. Cooling chambers to cryogenic temperatures (e.g., 4K) may greatly reduce the outgassing pressures of the materials and may provide pumping of materials that freeze on the surfaces or are trapped by cryogenic sorption. Cryogenic operations, however, place limits on the connectivity of devices and components in a vacuum system, may also limit the power loads of those devices and components, and may introduce vibration from either the piston motion of the closed cycle cryostats or the flow/boiling of cryogens in the flow cryostats.

Accordingly, techniques that can provide regions of XHV or near-XHV while retaining the benefits of room temperature UHV may be desirable in atomic systems (e.g., QIP systems, clocks, and sensor) that rely on trapped ion technology.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect of the disclosure, various techniques are described in which many of the benefits of a cryogenic vacuum system may be replicated in a small, controlled volume (e.g., pillbox) in a mostly room temperature UHV system by capping the volume with a suspended cryogenic cold finger that may be partially or fully coated in a high surface area cryogenic sorption material. The cold finger may act as a cryogenic pump. One of the features of such implementation is that the system is configured to ensure that all paths from outgassing materials to the controlled or critical volume (including multiple bounce paths off of other warm surfaces) require at least one bounce off of the high surface area materials on the cold finger. In that case, the outgassing material may be pumped before it can reach the controlled volume. To minimize vibrations from the cryogenic system cooling the cold finger, the cold finger may be only loosely mechanically connected to the rest of the chamber. In one aspect, the cold finger may be isolated along with the cryogenic system via a soft vacuum bellows. In one implementation, an XHV or near-XHV volume may be configured above or around an ion trap using a suspended cold finger.

In an aspect of the disclosure, a cryogenic device for use in a vacuum chamber is described that includes a suspended cold finger that forms a capping volume that covers or encloses a device under test (DUT), wherein the capping volume formed by the suspended cold finger is configured to have outgassing materials bounce off the cryogenic sorption material before reaching a critical volume over the DUT. A cryogenic sorption material having a large surface area can be deposited on one or more surfaces of the cold finger. In an example, the DUT is a trap such as an ion trap. Moreover, the critical volume over the DUT provides a localized region of XHV or near-XHV over the DUT while other regions in the vacuum chamber provide UHV.

In another aspect of the disclosure a method for using a cryogenic device in a vacuum chamber is described that includes cooling a suspended cold finger of the cryogenic device that forms a capping volume that encloses a DUT, wherein the capping volume formed by the suspended cold finger is configured to have outgassing materials bounce off the cold finger before reaching a critical or controlled volume over the DUT. The method further includes performing one or more quantum operations using the DUT. In an example, the DUT is a trap such as an ion trap. Moreover, the critical volume over the DUT provides a localized region of XHV or near-XHV over the DUT while other regions in the vacuum chamber provide UHV. A cryogenic sorption material having a large surface area can be deposited on one or more surfaces of the cold finger.

Each of the aspects described above can also be implemented using means for performing the various functions described in connection with those aspects.

BRIEF DESCRIPTION OF THE DRAWINGS

The appended drawings illustrate only some implementation and are therefore not to be considered limiting of scope.

DETAILED DESCRIPTION

Figure 1A:
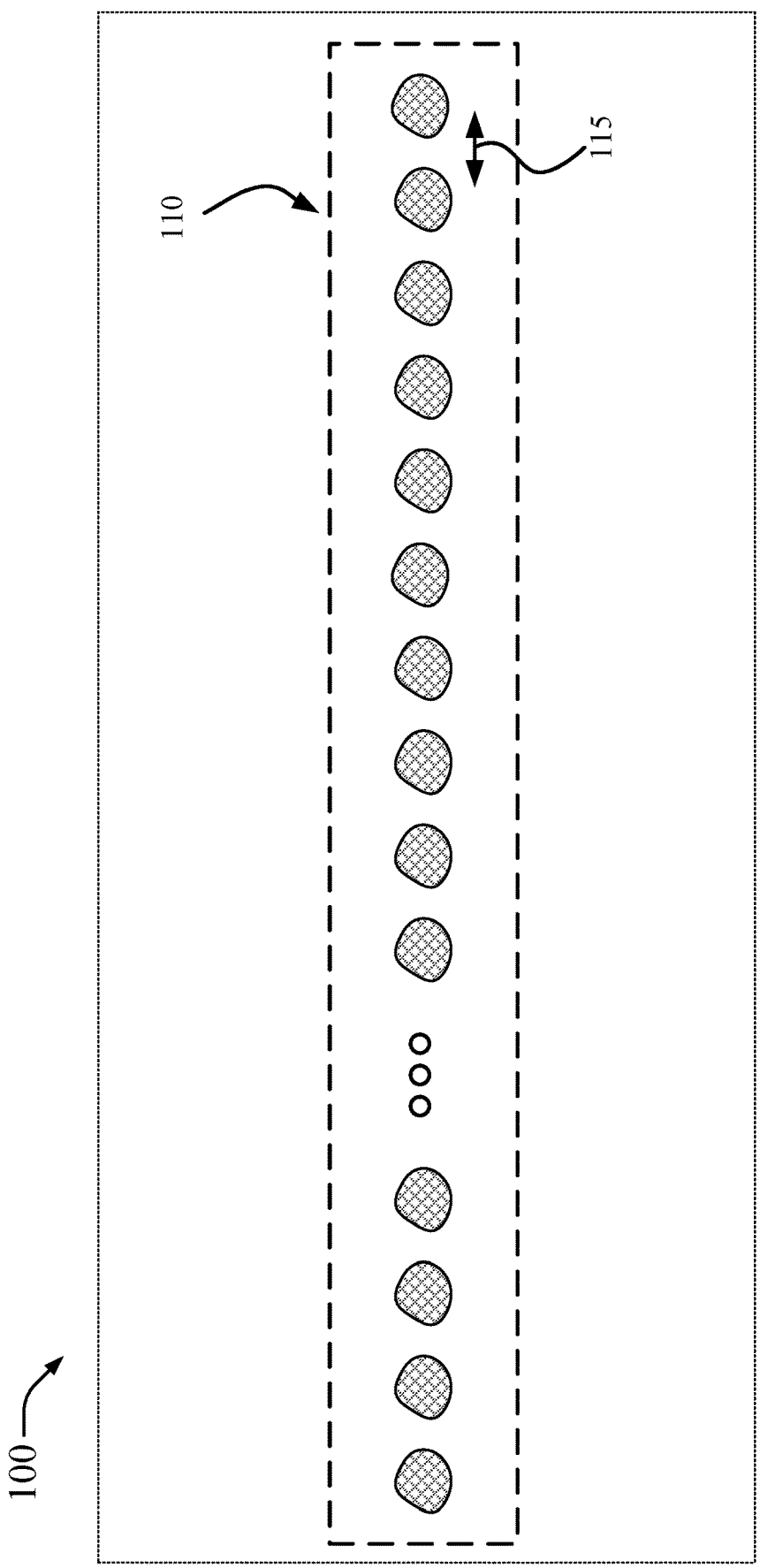
FIG. 1A illustrates a view of a vacuum chamber that houses electrodes for the trapping of atomic ions in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. As used herein, the term "about" may refer to a value that is within 1%, 2%, 3%, 4%, 5%, 10%. 15%, 20%, or 25% of a nominal value. In some instances, the term "about" may involve multiples of 2, 2.5, 3, 3.5, or 4 of a nominal value. For example, for cryogenic temperatures of about 4 degrees Kelvin (4K), the actual or practical temperatures may range to as much 10K, which is 2.5 times the nominal value of 4K.

As described above, trapped atoms may be used to implement quantum information processing. Atomic-based qubits can be used as different type of devices, including but not limited to quantum memories, the quantum bits in quantum computers and simulators, and nodes for quantum communication networks. Qubits based on trapped atomic ions (e.g., atoms with a net state of electrical charge) can have very good coherence properties, can be prepared and measured with nearly 100% efficiency, and can be readily entangled with each other by modulating their Coulomb interaction or through remote photonic interconnects. Lattices of cold (e.g., laser-cooled) trapped atoms have also proven useful for precision metrology, including sensors of small forces and atomic clocks. As used in this disclosure, the terms "atoms," "atomic ions," and "ions" may be used interchangeably to describe the particles that are isolated and controlled, or are actually confined individually or as multiples with the latter forming a diffuse cloud or a crystal lattice or similar arrangement or configuration. Where the charge state of the atom (neutral atom or any charge state of the atomic ion) is not relevant, the disclosure describes techniques that can be used for any type of neutral atom or atomic ion or other type of optically active quantum system. This disclosure describes techniques for a vibrationally isolated cold finger and/or cryogenic shield for local high-quality vacuum.

In the case of atomic ions, the typical ion trap geometry or structure used for quantum information and metrology purposes is the linear radio-frequency (RF) Paul trap (also referred to as an RF trap or simply a Paul trap), where nearby electrodes hold static and dynamic electrical potentials that lead to an effective inhomogeneous harmonic confinement of the ions. The RF Paul trap is a type of trap that uses electric fields to trap or confine one or more charged particles in a particular region, position, or location. When multiple atomic ions are loaded into such a trap are laser-cooled to very low temperatures, the atomic ions form a stationary lattice of qubits (e.g., a structured arrangement of qubits), with Coulomb repulsion balancing the external confinement force. For sufficient trap anisotropy, the ions can form a linear lattice along the weak direction of confinement, and this is the arrangement typically employed for applications in quantum information and metrology. As the trap anisotropy is reduced, the atomic ions undergo a series of phase transitions in their static conformation in space, evolving to a two-dimensional (2D) zig-zag or jagged type structure, then a three-dimensional (3D) helical structure, ultimately toward a spherical lattice when the three directions of confinement approach isotropy.

FIG. 1A illustrates a partial view of a vacuum chamber 100 that houses electrodes for the trapping of atomic ions in a linear lattice or crystal 110 using a linear RF Paul trap. Although not shown, it is also possible to trap single atomic ions using an RF Paul trap. In the example shown in FIG. 1A, a vacuum chamber in a quantum system includes electrodes for trapping one or more atomic Ytterbium ions (e.g., $^{171}Yb^+$ ions) which are confined in the linear lattice 110 and are laser-cooled to be nearly at rest. While multiple atomic ions are shown in this example, the number of atomic ions trapped can be configurable and more or fewer than the number of atomic ions shown may be trapped including, but not limited to, the configuration with a single ion being trapped. The atoms are illuminated with laser radiation tuned to a resonance in $^{171}Yb^+$ and the fluorescence of the atomic ions is imaged onto a camera. In this example, atomic ions are separated by a distance 115 of about 5 microns (µm) from each other as shown by fluorescence. The separation of the atomic ions is determined by a balance between the external confinement force and Coulomb repulsion.

Atomic ions are typically loaded into traps by creating a neutral atomic flux of the desired particle, and ionizing them once in the trapping volume. Ions can remain confined for months, with lifetimes often limited by the level of vacuum. Elastic collisions with residual background gas occur roughly once per hour per ion at typical ultra-high vacuum (UHV) pressures (~$10^{-11}$ torr) and these collisions might or might not eject on ore more ions from the trap. Cryogenic chambers can virtually eliminate these collision events by further reducing the background pressure by limiting the outgassing of materials and providing pumping of gasses through mechanisms such as freezing of gasses on cold surfaces and cryogenic sorption of gasses into high surface area materials.

Figure 1B:
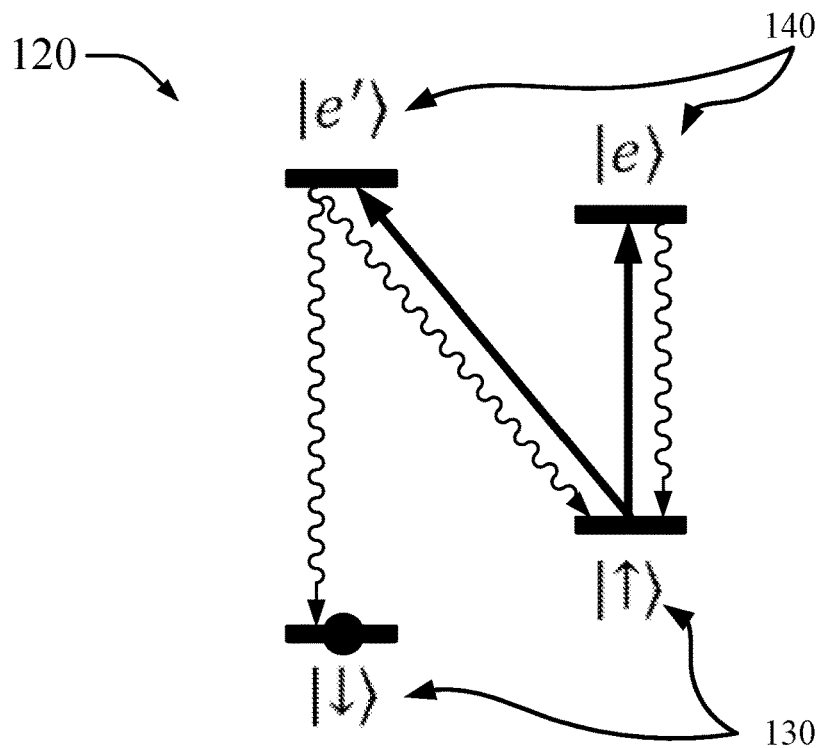
FIG. 1B is a diagram illustrating an example of a simplified energy level diagram showing the application of laser radiation for state initialization in accordance with aspects of the disclosure.
Figure 1C:
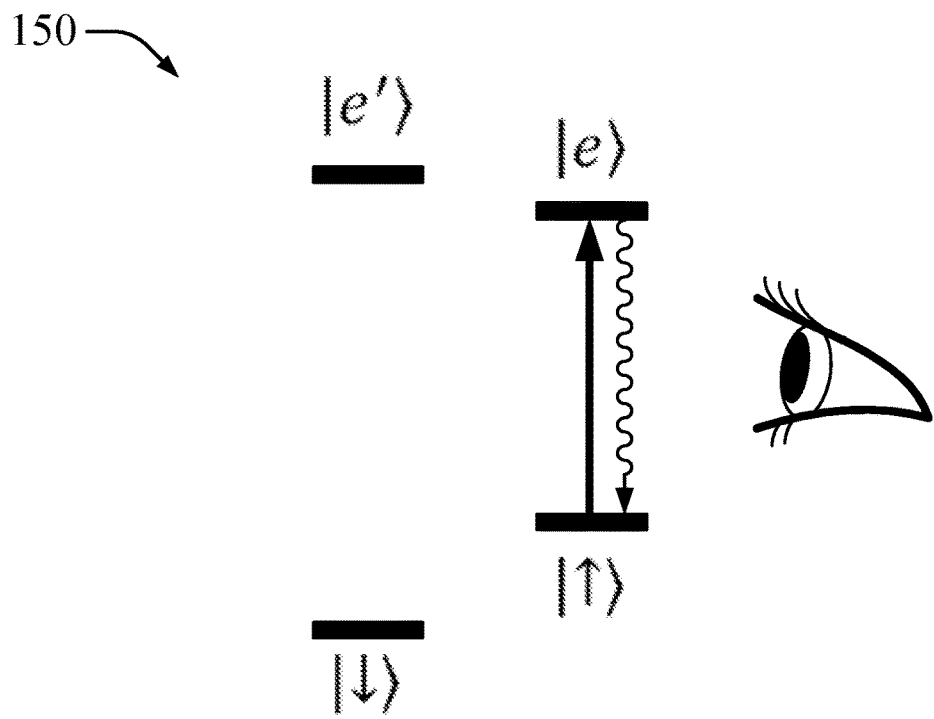
FIG. 1C is a diagram illustrating an example of a simplified energy level diagram showing the application of laser radiation for qubit state detection through fluorescence in accordance with aspects of the disclosure.

FIG. 1B and FIG. 1C show the reduced energy level diagrams 120 and 150, respectively, for an example species of atomic ion $^{171}$Yb$^+$ where the two states of the quantum bits (qubits) $|\uparrow\rangle$ and $|\downarrow\rangle$ 130 are represented by the stable hyperfine levels in the ground electronic state, and are separated approximately by frequency $\omega_0/2\pi$=12.642 GHz. The excited electronic states $|e\rangle$ and $|e'\rangle$ 140 in $^{171}$Yb$^+$ are themselves split by a smaller hyperfine coupling and are separated from the ground states by an optical interval having an energy corresponding to an optical wavelength of 369.53 nm.

In FIGS. 1B and 1C, all allowed transitions from the excited electronic states $|e\rangle$ and $|e'\rangle$ 140 are illustrated as downward, wavy arrows. On the other hand, the applied laser radiation (which is shown as upward, straight arrows) drive these transitions for initialization to state $|\downarrow\rangle$ as shown in FIG. 1B, and for fluorescence detection of the qubit state ($|\uparrow\rangle$=fluorescence, $|\downarrow\rangle$=no fluorescence) as shown in FIG. 1C.

Laser radiation tuned just below resonance in these optical transitions allows for Doppler laser cooling to confine the atomic ions near the bottom of the trapping potential. Other more sophisticated forms of laser cooling can bring the atomic ions to be nearly at rest in the trap.

Below are described various techniques for creating a controlled volume of XHV or near-XHV in a mostly room temperature UHV system. This controlled volume may be created by capping or surrounding the volume with a suspended cryogenic cold finger that may be partially or fully coated in a high surface area cryogenic sorption material. The cold finger may act as a cryogenic pump and the system is configured to ensure that all paths from outgassing materials to the controlled or critical volume (including paths from warm surfaces) require at least one bounce off of the cold finger such that the outgassing material may be pumped before it can reach the controlled volume. To minimize vibrations from the cryogenic system cooling the cold finger, the cold finger may be only loosely mechanically connected to the rest of the chamber. The cold finger may be isolated along with the cryogenic system via a soft vacuum bellows.

As used herein, the term UHV may refer to a pressure range between about $10^{-7}$ and about $10^{-10}$ Pa, while the term XHV may refer to a range of pressure below about $10^{-10}$ Pa ($7.5 \times 10^{-13}$ Torr or $10^{-12}$ mbar). Here, we refer to near-XHV as UHV vacuum that is approaching the XHV range.

Figure 2:
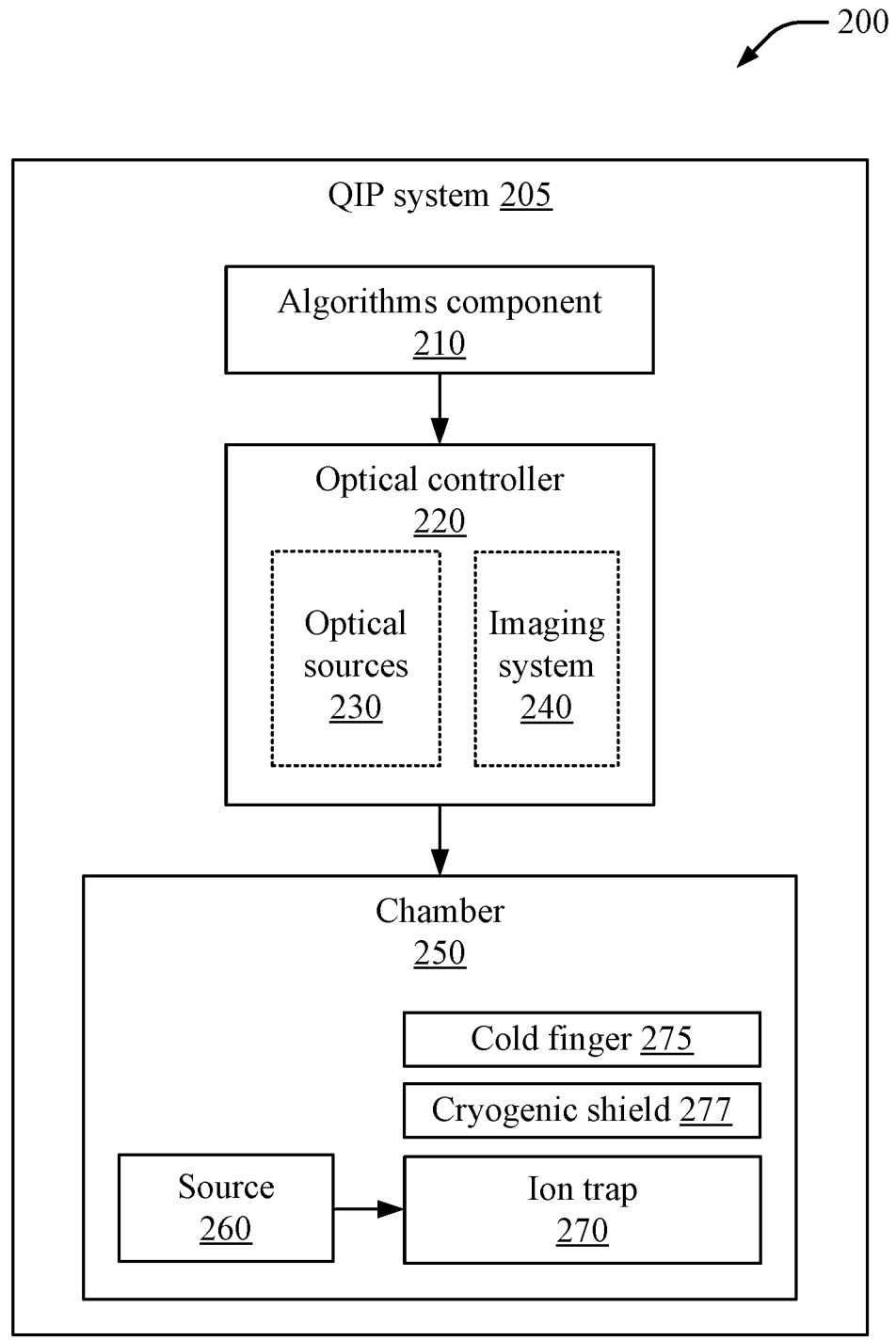
FIG. 2 is a block diagram that illustrates an example of a quantum information processing (QIP) system in accordance with aspects of this disclosure.

FIG. 2 shows a block diagram 200 that illustrates an example of a QIP system 205 in accordance with aspects of this disclosure. The QIP system 205 may also be referred to as a quantum computing system, a computer device, or the like. In an aspect, the QIP system 205 may correspond to portions of a quantum computer implementation of the computing device 500 in FIG. 5.

The QIP system 205 can include a source 260 that provides atomic species (e.g., a flux of neutral atoms) to a chamber 250 (see e.g., the vacuum chamber 100 in FIG. 1A) having an ion trap 270 that traps the atomic species once ionized (e.g., photoionized) by an optical controller 220. The source 260 may be part of the chamber 250 (or may be implemented separate from and outside of the chamber 250) and can include a thermal atom source or atomic oven source to produce a flux. Optical sources 230 in the optical controller 220 may include one or more laser sources that can be used for ionization of the atomic species, control (e.g., quantum state control) of the atomic ions, for fluorescence of the atomic ions that can be monitored and tracked by image processing algorithms operating in an imaging system 240 in the optical controller 220, and for overall control of optical operations associated with the atomic ions in the ion trap 270. The imaging system 240 can include a high resolution imager (e.g., CCD camera) for monitoring the atomic ions while they are being provided to the ion trap 270 (e.g., for counting) or after they have been provided to the ion trap 270 (e.g., for monitoring the atomic ions states). In an aspect, the imaging system 240 can be implemented separate from the optical controller 220, however, the use of fluorescence to detect, identify, and label atomic ions using image processing algorithms may need to be coordinated with the optical controller 220.

Although not shown, one or more radio-frequency (RF) amplifiers may be used to provide RF potential to the ion trap 270 for operation, as well as one or more DC sources also to be used with the ion trap 270. Moreover, the chamber 250 may include a cold finger 275 and a cryogenic shield 277, where one or both of these may be used to produce a controlled or critical volume over the ion trap 270 to provide a high-quality vacuum (e.g., XHV). An example of a chamber with a cold finger and a cryogenic shield is described in more detail below with respect to FIGS. 3A-3C.

The QIP system 205 may also include an algorithms component 210 that may operate with other parts of the QIP system 205 (not shown) to perform quantum algorithms or quantum operations. As such, the algorithms component 210 may provide instructions to various components of the QIP system 205 (e.g., to the optical controller 220) to enable the implementation of the quantum algorithms or quantum operations.

Figure 3A:
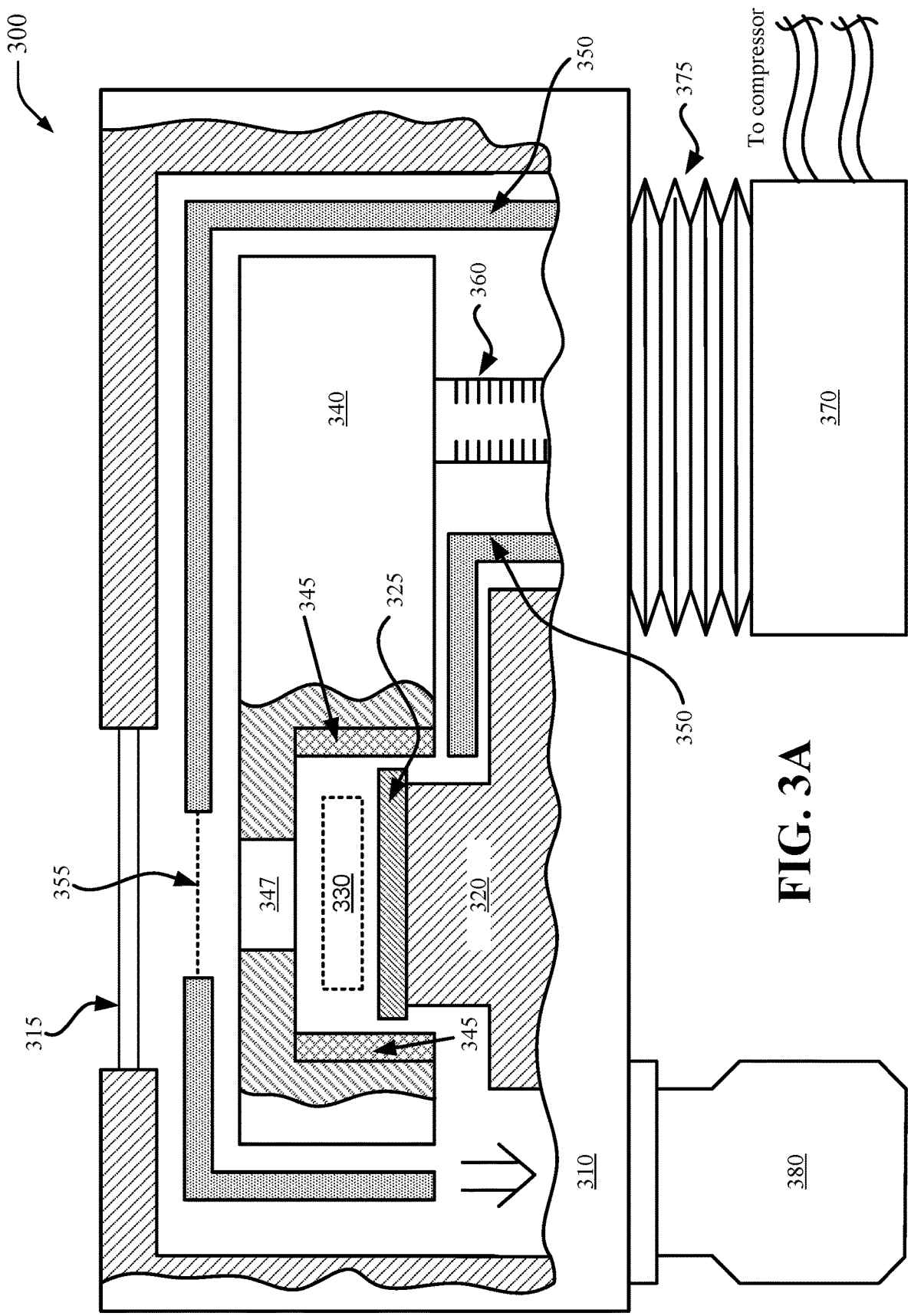
FIG. 3A is a diagram that illustrates a cross sectional view of a vacuum chamber with a local high quality vacuum in accordance with aspects of this disclosure.

FIG. 3A shows a diagram 300 that illustrates a partial cross sectional view of a vacuum chamber 310 with a localized high quality vacuum (e.g., XHV) 330 in accordance with aspects of this disclosure. The vacuum chamber 310 may be an example of the chamber 250 in FIG. 2 or the vacuum chamber 100 in FIG. 1A. The vacuum chamber 310 may include a mounting system 320 on which to place a device under test (DUT) 325. The DUT 325 may correspond to a trap such as an ion trap (e.g., the ion trap 270 in FIG. 2) or may correspond to a different device being tested or used for quantum computations. The vacuum chamber 310 or components within the vacuum chamber (e.g., the mounting system 320) may be cooled or heated as required by the application or component use. For example, in addition to cooling a trap it is also possible to heat sensors such as a vacuum gauge. Parts of the vacuum chamber 310 may have unwanted outgassing properties. For example, the mounting system 320 may have unwanted outgassing properties, however, these may be limited by controlling the line of sight (e.g., path) from the mounting system 320 to a critical volume 330. For example, the mounting system 320 (as well as other components of the vacuum chamber 310) may be made of stainless steel and may introduce hydrogen gas into the vacuum. The critical volume 330 may refer to a volume, space, or region just above the DUT 325 within which high quality vacuum (e.g., XHV) is achieved. It is to be understood that other volumes, spaces, or regions within the vacuum chamber 310 may achieve UHV and that the improved vacuum (e.g., XHV) is localized to the critical volume 330.

The critical volume 330 may be enveloped or capped by a volume, space, or region produced by the configuration or shape of a cold finger 340. The cold finger 340 may be cooled to about 4 degrees Kelvin (4K) and may have one or more surfaces that surround the critical volume 330 and are covered with a high surface area cryogenic sorption material 345, which may also operate at about 4K. The cold finger 340 may include a window or hole 347 through which laser beams may be directed at the DUT 325.

Figure 3B:
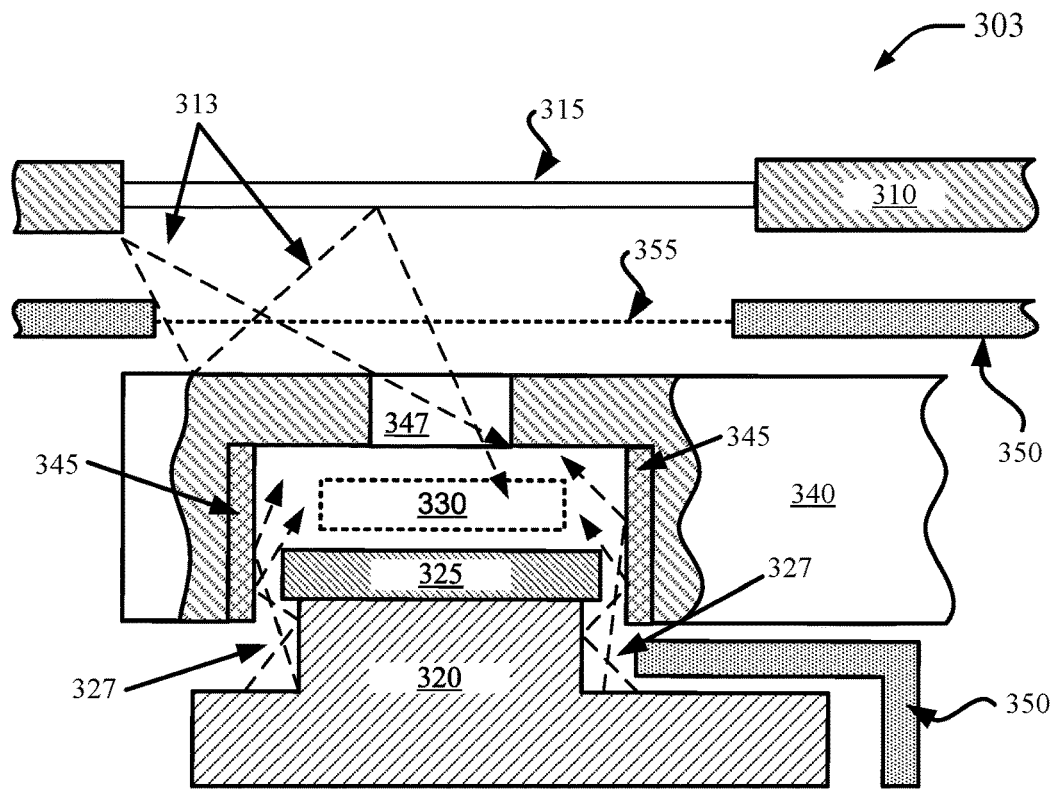
FIGS. 3B and 3C are diagrams that illustrate a cold finger for capping a controlled or critical volume for XHV or near-XHV in a vacuum chamber in accordance with aspects of this disclosure.

FIG. 3B shows a diagram 303 that illustrates how the configuration and placement of the cold finger 340 restricts outgassing (represented by dashed lines with arrows 327) from, for example, the mounting system 320 to contact the high surface area cryogenic sorption material 345 before reaching the critical volume 330. At the contact with the sorption material 345, there is a likelihood that the outgassing material will be captured (absorbed) by the sorption material 345 and prevented from continuing to the critical volume 330.

Figure 3C:
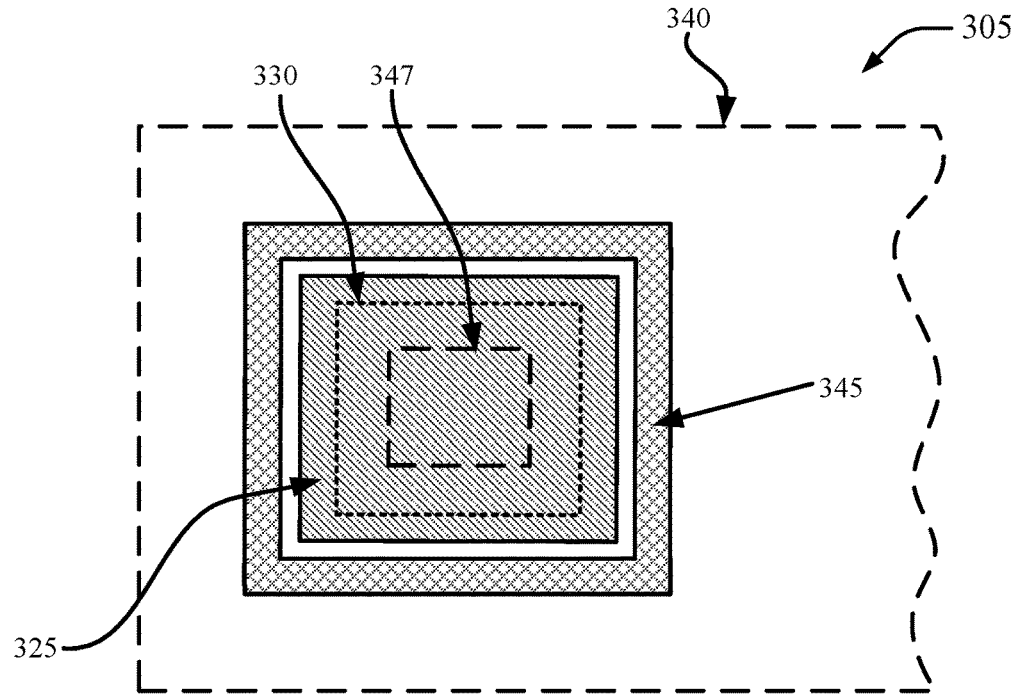

FIG. 3C shows a diagram 305 that illustrates an example of how the cold finger 340 may include various inner surfaces covered by the high surface area cryogenic sorption material 345 surrounding the DUT 325 and/or the critical volume 330 to achieve the XHV or near-XHV within the critical volume 330.

Returning to FIG. 3A, the vacuum chamber 310 may include a vacuum viewport 315 of a very low outgassing material. This surface may have a region with a line of sight to the critical volume 330. Line-of-site to this region of the vacuum viewport 315 by outgassing materials may be controlled by the placement and configuration of the cold finger in such a way as to require outgassing (represented by dashed lines with arrows 313 in FIG. 3B) from surrounding materials to bounce at least once from the cold finger 340 (which may be coated with sorption material) before they can reach this line-of-site region on the vacuum viewport 315. When the outgassing bounces on the cold finger 340, there is a change of the outgassing being captured onto the cold finger (i.e. freezing out onto the surface or being absorbed by a coating of sorption material). This aspect may allow for there to be openings and/or windows in the cold finger 340.

Also shown in FIG. 3A and FIG. 3B is a cryogenic shield 350 that is positioned near the cold finger 340 and is configured to reduce a thermal loading of the cold finger 340. In the example shown in FIG. 3A, there are two cryogenic shields 350 shown which may be connected around the sides of the cold finger 340 (not shown in the partial cross sectional view of FIG. 3A). The cryogenic shield 350 may include (shown with a dotted line) an opening or window 355. A window might be used there to isolate the critical volume 330 from a warm surface of the vacuum viewport 315 via a cold window surface and/or to reduce thermal load on the cold finger 340 by absorbing or reflecting infra-red (IR) light coming from outside the vacuum chamber 310. However, the addition of such a window 355 might couple some motion of the phase/angle of the laser going through it so the use or implementation of the window 355 may depend on the particular needs of the experiment or operation associated with the vacuum chamber 310.

Attached or coupled to the vacuum chamber 310 are a room temperature ion pump 380, a cryogenic cooler 370 that cools the cold finger 340, and the cryogenic shield 350. The cryogenic cooler 370 may be coupled to the vacuum chamber 310 via soft vacuum bellows 375 to reduce transfer of vibrations from the cryogenic cooler to the vacuum chamber.

Also shown in FIG. 3A is a cryogenic head 360 that extends from, and is part of, the cryogenic cooler 370. The cryogenic head 360 is configured to connect to the cold finger 340 to cool the cold finger 340 to a temperature of about 4K (in practice this temperature can range up to about 10 K). The cryogenic head 360 is also configured to connect to the cryogenic shield 350 to cool the cryogenic shield 350 to a temperature of about 40K (in practice this temperature can range up to about 3 times the 40K). Although not shown, the connection of the cryogenic head 360 to the cryogenic shield(s) 350 may occur closer to the cryogenic cooler 370 than the connection of the cryogenic head 360 to the cold finger 340.

Therefore, by adding a cold finger (e.g., the cold finger 340) to create a controlled vacuum volume with high quality vacuum it may be possible to get some of the benefits of cryogenic systems while also providing mechanical rigidity for the DUT 325 to the vacuum chamber 310.

In an aspect of this disclosure, the vacuum chamber 310 shown in FIG. 3A and cryogenic cold finger 345 may be supplemented with cooling of the DUT 325 (e.g., ion trap) and possibly nearby components (e.g., the mounting system 320) to reduce outgassing from the material of the DUT 325 and surrounding components. Cooling for the purpose of reducing outgassing from the DUT 325 and surrounding components may not require as low a temperature as needed for the cold finger 340, and may be achieved using techniques such as liquid nitrogen cooling lines, that do not introduce vibrations and can handle higher thermal loads than the cryogenic cooler used for the cold finger.

It is to be understood that the various components and/or parts shown in FIGS. 3A-3C may not be drawn to scale and are provided by way of illustration and not of limitation. The dimensions, spacing, and positioning of the various components and/or parts shown in FIGS. 3A-3C may be exaggerated for clear illustration.

Figure 4:
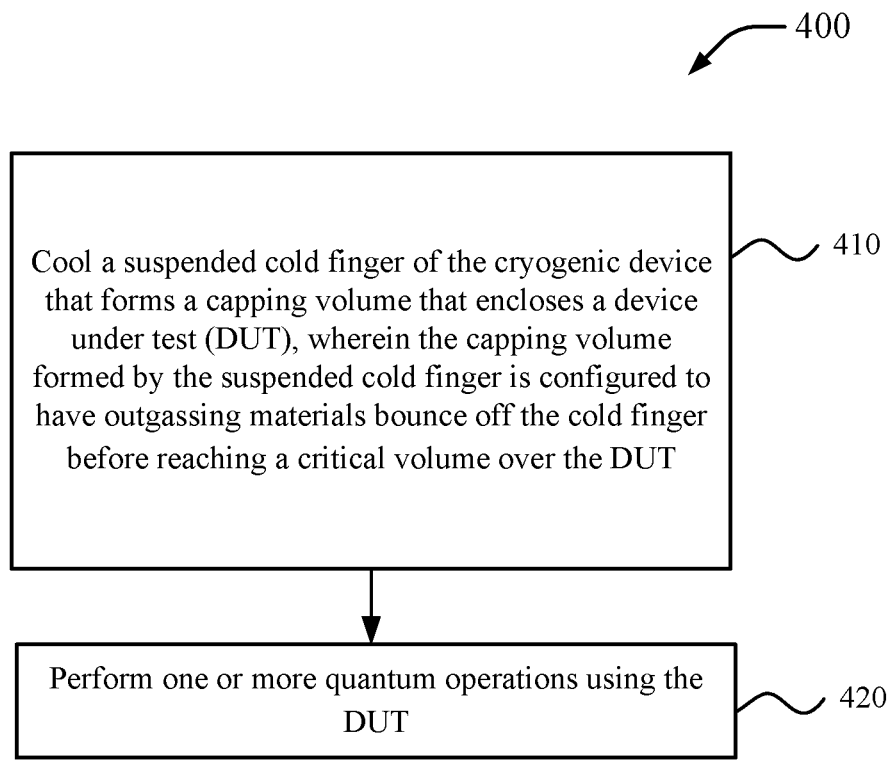
FIG. 4 is a flow diagram that illustrates an example of a method in accordance with aspects of this disclosure.

FIG. 4 is a flow diagram that illustrates an example of a method 400 for using a vacuum chamber with a localized XHV or near-XHV in a QIP system in accordance with aspects of this disclosure. In an aspect, the method 400 may be performed in a computer system such as the computer system 500 described below. Similarly, the functions of the method 400 may be performed by one or more components of a QIP system such as the QIP system 205 and its components, where the QIP system can include an ion trap. For example, the method 400 may be performed in connection with the chamber 250 in FIG. 2 or the vacuum chamber 310 in FIG. 3A and/or other components configured to operate, control, interact, and/or configure the chamber 250 or the vacuum chamber 310.

At 410, the method 400 includes cooling a suspended cold finger of the cryogenic device that forms a capping volume that encloses a DUT, wherein the capping volume formed by the suspended cold finger is configured to have outgassing materials bounce off of the cold finger before reaching a critical volume. In an aspect, the DUT is a trap such as an ion trap. Moreover, the cold finger may be cooled to about 4K. A cryogenic sorption material having a large surface area can be deposited on one or more surfaces of the cold finger.

At 420, the method 400 includes performing one or more quantum operations using the DUT.

In an aspect of the method 400, the critical volume over the DUT provides a localized region of XHV or near-XHV over the DUT while other regions in the vacuum chamber provide UHV.

In another aspect of the method 400, the cryogenic device includes a shield configured to reduce thermal loading of the cold finger. The method may further include cooling the shield to about 40K.

In another aspect of the method 400, the method may further include performing room temperature vacuum pumping of the vacuum chamber using an ion pump.

In yet another aspect of the method 400, the method may further include vibrationally isolating the cold finger from the vacuum chamber by soft vacuum bellows.

Figure 5:
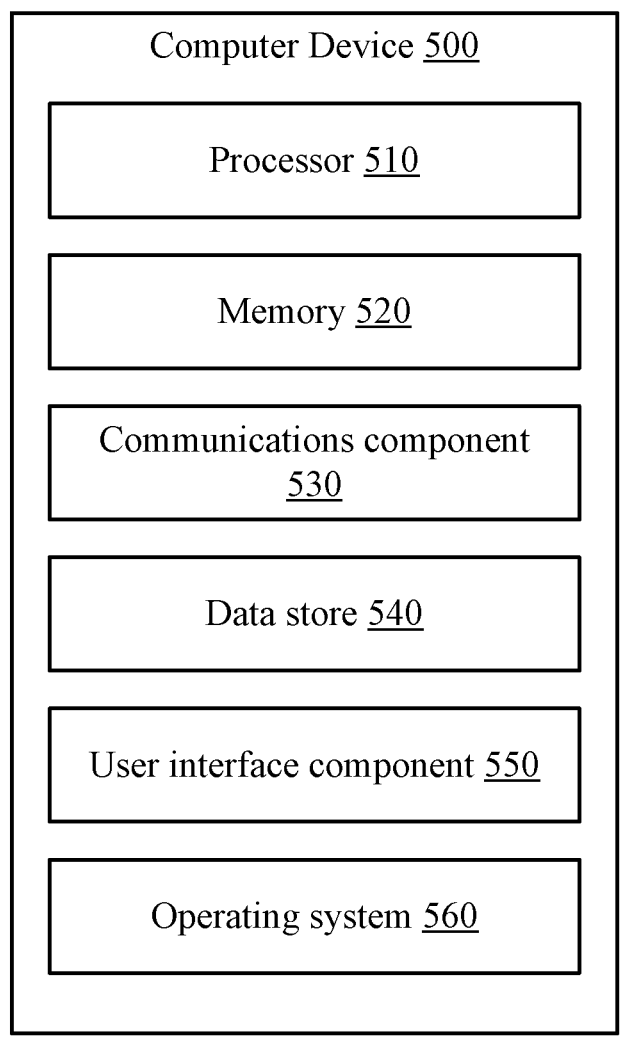
FIG. 5 is a diagram that illustrates an example of a computer device in accordance with aspects of this disclosure.

Referring now to FIG. 5, illustrated is an example computer device 500 in accordance with aspects of the disclosure. The computer device 500 can represent a single computing device, multiple computing devices, or a distributed computing system, for example. The computer device 500 may be configured as a quantum computer, a classical computer, or a combination of quantum and classical computing functions. For example, the computer device 500 may be used to process information using quantum algorithms based on trapped ion technology and may therefore implement a vacuum chamber with a localized XHV or near-XHV volume as described above. As described above, the QIP system 205 may be an example of at least a portion of the computer device 500.

In one example, the computer device 500 may include a processor 510 for carrying out processing functions associated with one or more of the features described herein. The processor 510 may include a single or multiple set of processors or multi-core processors. Moreover, the processor 510 may be implemented as an integrated processing system and/or a distributed processing system. The processor 510 may include a central processing unit (CPU), a quantum processing unit (QPU), a graphics processing unit (GPU), or combination of those types of processors. In one aspect, the processor 510 may refer to a general processor of the computer device 510, which may also include additional processors 510 to perform more specific functions such as control of the operations (e.g., cooling, pumping) of a vacuum chamber, for example.

In an example, the computer device 500 may include a memory 520 for storing instructions executable by the processor 510 for carrying out the functions described herein. In an implementation, for example, the memory 520 may correspond to a computer-readable storage medium that stores code or instructions to perform one or more of the functions or operations described herein. In one example, the memory 520 may include instructions to perform aspects of a method 400 described below in connection with FIG. 4. Just like the processor 510, the memory 520 may refer to a general memory of the computer device 500, which may also include additional memories 520 to store instructions and/or data for more specific functions such as instructions and/or data for control of the operations (e.g., cooling, pumping) of a vacuum chamber, for example.

Further, the computer device 500 may include a communications component 530 that provides for establishing and maintaining communications with one or more parties utilizing hardware, software, and services as described herein. The communications component 530 may carry communications between components on the computer device 500, as well as between the computer device 500 and external devices, such as devices located across a communications network and/or devices serially or locally connected to computer device 500. For example, the communications component 500 may include one or more buses, and may further include transmit chain components and receive chain components associated with a transmitter and receiver, respectively, operable for interfacing with external devices.

Additionally, the computer device 500 may include a data store 540, which can be any suitable combination of hardware and/or software, that provides for mass storage of information, databases, and programs employed in connection with implementations described herein. For example, the data store 540 may be a data repository for operating system 560 (e.g., classical OS, or quantum OS). In one implementation, the data store 540 may include the memory 520.

The computer device 500 may also include a user interface component 550 operable to receive inputs from a user of the computer device 500 and further operable to generate outputs for presentation to the user or to provide to a different system (directly or indirectly). The user interface component 550 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 550 may include one or more output devices, including but not limited to a display, a speaker, a haptic feedback mechanism, a printer, any other mechanism capable of presenting an output to a user, or any combination thereof.

In an implementation, the user interface component 550 may transmit and/or receive messages corresponding to the operation of the operating system 560. In addition, the processor 510 may execute the operating system 560 and/or applications or programs, and the memory 520 or the data store 540 may store them.

When the computer device 500 is implemented as part of a cloud-based infrastructure solution, the user interface component 550 may be used to allow a user of the cloud-based infrastructure solution to remotely interact with the computer device 500.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A method for using a cryogenic device in a vacuum chamber with a viewport, comprising:
    cooling a cold finger of the cryogenic device that forms a capping volume that encloses a device under test (DUT) placed on a mounting system inside the vacuum chamber, the cold finger having an opening or window;
    providing a shield positioned inside the vacuum chamber and over and around a portion of the cold finger to reduce thermal loading of the cold finger, the shield having a window in alignment with the opening or window of the cold finger and the viewport of the vacuum chamber;
    providing the viewport in alignment with the opening or window of the cold finger and the DUT, such that laser beams generated outside of the vacuum chamber are directed at the DUT through the viewport of the vacuum chamber, the window of the shield, and the opening or window of the cold finger;
    disposing the cold finger to at least partially surround the DUT to restrict paths for outgassing materials to reach the capping volume to configure a localized vacuum in the capping volume that is of a higher quality than a quality of vacuum in other regions within the vacuum chamber; and performing one or more quantum operations using the DUT by applying the laser beams generated outside the vacuum chamber directed at the DUT through the viewport of the vacuum chamber, the window of the shield, and the opening or window of the cold finger.

2. The method of claim 1, wherein the localized vacuum in the capping volume is an extreme high vacuum (XHV) or near-XHV while the vacuum in the other regions in the vacuum chamber is an ultra-high vacuum (UHV).

3. The method of claim 1, wherein the DUT is a trap.

4. The method of claim 3, wherein the trap is an ion trap having electrodes for confining a configurable number of atomic ions in a linear lattice and the laser beams generated outside the vacuum chamber are directed to the atomic ions.

5. The method of claim 1, wherein the cold finger is cooled to about 4K.

6. The method of claim 5, further comprising cooling the shield to about 40K.

7. The method of claim 1, further comprising providing a cryogenic head inside the vacuum chamber, the cryogenic head being connected to the cold finger for cooling the cold finger.

8. The method of claim 7, wherein the cryogenic head is also connected to the shield for cooling the shield.

9. The method of claim 7, further comprising reducing vibrations provided to the cold finger and the cryogenic head by a cryogenic cooler outside the vacuum chamber by positioning vacuum bellows between the cryogenic cooler and the vacuum chamber.

10. The method of claim 1, further comprising performing vacuum pumping of the vacuum chamber using an ion pump.

11. The method of claim 1, further comprising cooling the DUT to about 70K, wherein the cooling comprises performing a low-vibration cooling operation or method.

12. The method of claim 1, wherein one or more surfaces of the cold finger are covered with a cryogenic sorption material with a large surface area.

13. The method of claim 1, wherein the shield reduces thermal loading of the cold finger by absorption or reflection of infra-red (IR) light coming from outside the vacuum chamber.

* * * * *